UNITED STATES PATENT OFFICE.

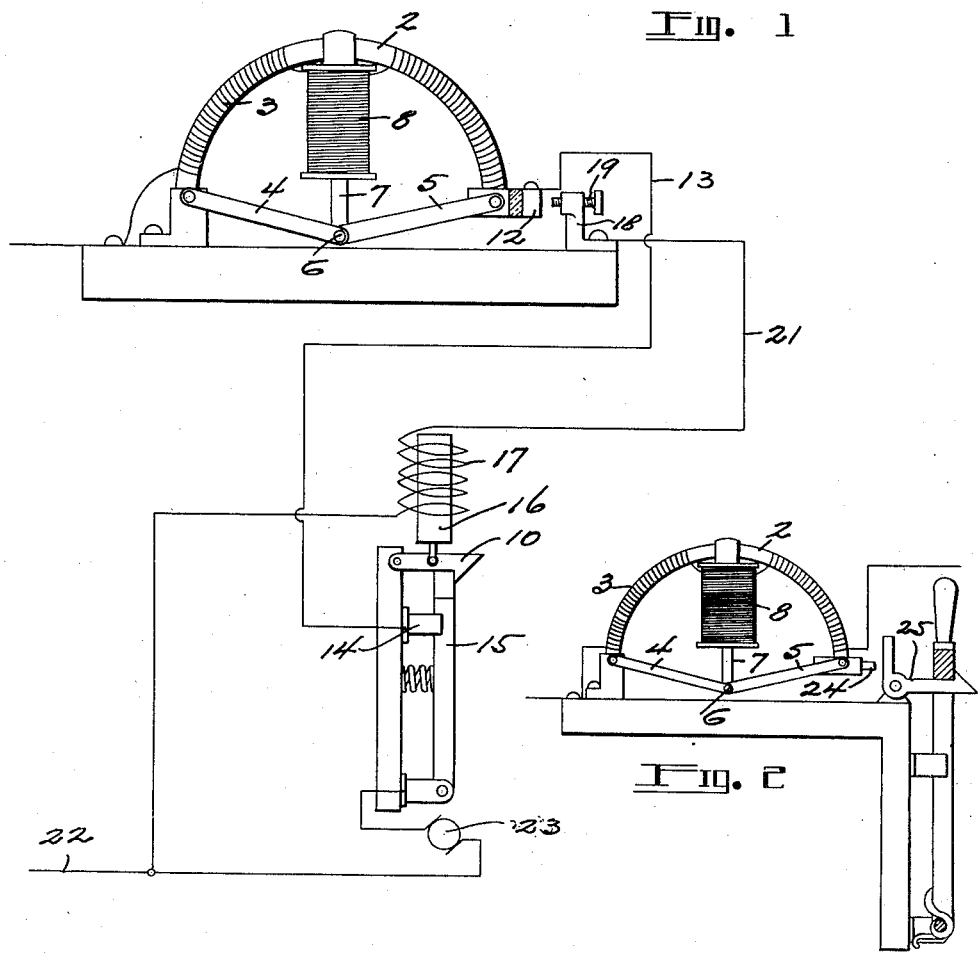

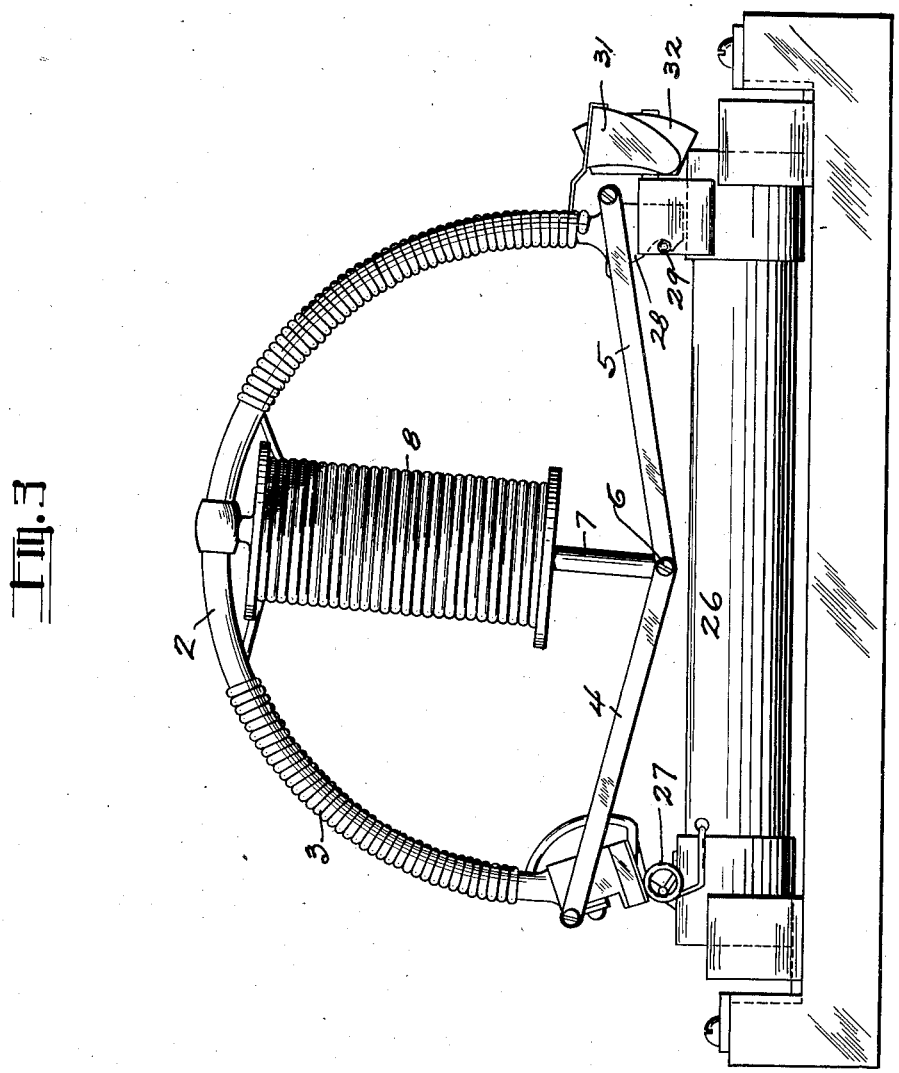

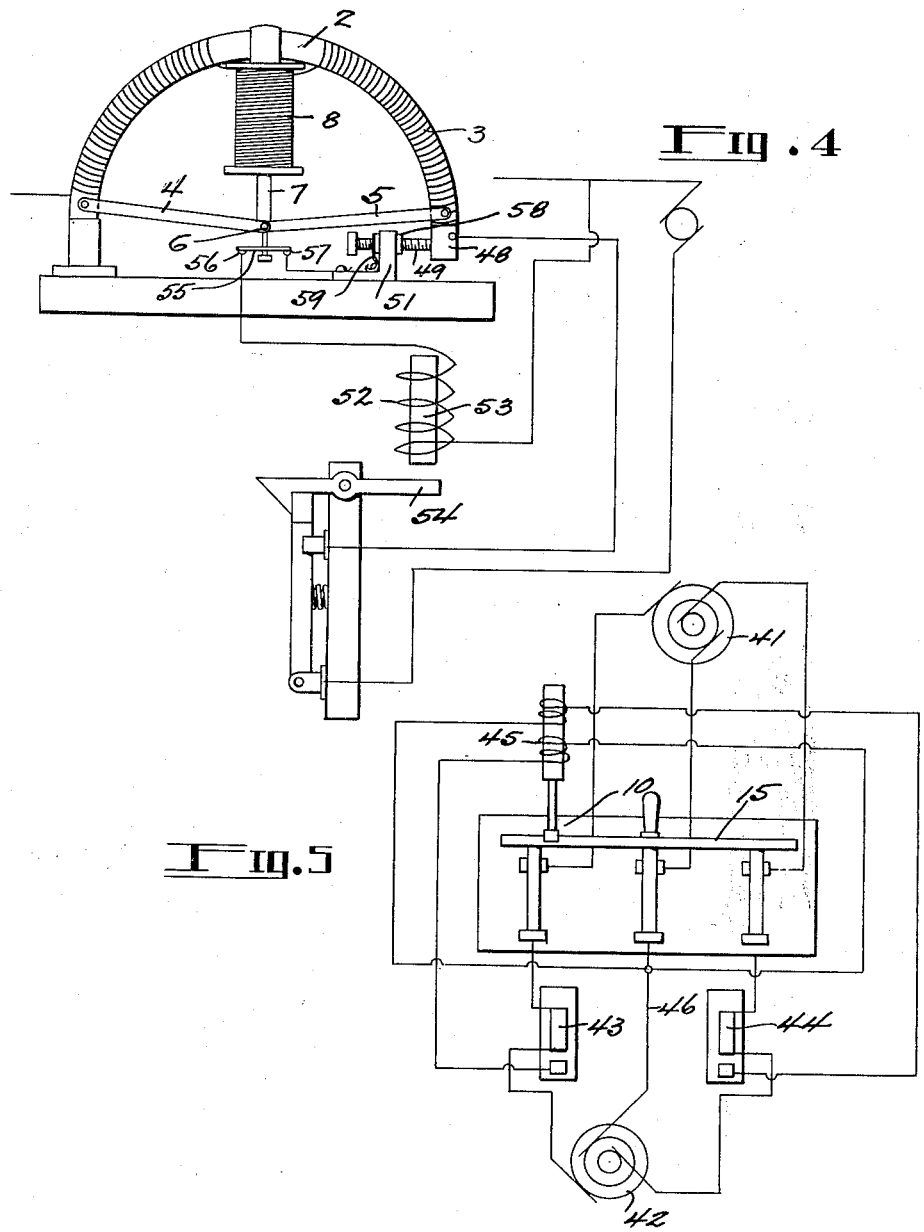

SYDNEY NORTON BARUCH, OF SAN FRANCISCO, CALIFORNIA.

ELECTRIC-CIRCUIT-PROTECTING DEVICE.

1,427,255.   Specification of Letters Patent.   Patented Aug. 29, 1922.

Application filed November 11, 1919.   Serial No. 337,346.

*To all whom it may concern:*

Be it known that I, SYDNEY NORTON BARUCH, a citizen of the United States, and a resident of the city and county of San Francisco, State of California, have invented a certain new and useful Electric-Circuit-Protecting Device, of which the following is a specification.

The invention relates to devices for opening an electric circuit containing electrical apparatus when the temperature of the apparatus approaches a dangerous value or when the magnitude of the current becomes excessive.

An object of the invention is to provide a device for opening an electric circuit which is operated by the combined thermal and magnetic effects of the current in the circuit.

Another object of the invention is to provide a protective apparatus which will operate to open the circuit immediately upon the presence of a short circuiting current in the circuit and which will operate to open the circuit when a dangerous temperature is approached in the apparatus due to overload currents of various magnitudes.

The invention possesses other advantageous features, some of which, with the foregoing, will be set forth at length in the following description where I shall outline in full, those forms of the invention which I have selected for illustration in the drawings accompanying and forming part of the present specification. In said drawings I have shown several modified forms of the device of my invention, but it is to be understood that I do not limit myself to such forms, since the invention, as expressed in the claims may be embodied in a plurality of forms.

Referring to said drawings:

Figure 1 is an elevation of one form of device of my invention, showing a switch controlling solenoid which is thrown into operation by the device of my invention.

Figure 2 is an elevation of a modified form of device in which the switch is mechanically tripped.

Figure 3 is an elevation of a modified form of device in which the device itself comprises the switch or circuit breaker.

Figure 4 is a diagrammatic elevation of a modified type of device which is constructed to open the circuit on overloads and also on no-voltage conditions.

Figure 5 is a diagrammatic representation of a three phase electric circuit equipped with the form of device shown in Figure 1.

The device of my invention is operated by the combined heating effect and magnetic effect of the current flowing in a circuit, to open the circuit when dangerous conditions are approached in the apparatus in the circuit. On small continued overloads which if continued for a sufficient time, would raise the temperature of the windings of the apparatus in circuit, to a dangerous temperature, the circuit breaking device is operated mainly by the thermal effect of the current. On large overloads, such as exist when short-circuiting occurs, the device is operated by the magnetic effect of the current. Ordinary overloads of short duration, such as are encountered in starting motors, will not cause the device to operate to open the circuit, in fact, the device is designed to open the circuit only when a continuation of the existing current flow would be immediately deleterious to the windings of the apparatus in circuit, which may be a motor, a transformer or other electrical apparatus. The device is designed so that it is responsive to the temperature which obtains in the hottest part of the apparatus being protected and such hottest part is usually in the embedded windings of the apparatus. The device is also preferably designed so the heating characteristic of its thermal responsive element corresponds directly with the heating characteristic of the hottest part of the apparatus, that is, the temperature of the thermal responsive device may be the same as or bear a definite relation to the temperature of the hottest part of the apparatus.

The device of my invention may be employed as a relay, to open or close a solenoid circuit which controls the position of the switch or circuit breaker, it may be mechanically connected to the switch holding means or it may in itself serve as the circuit breaker or switch. The device may be exposed to air or it may be disposed in a receptacle containing oil so that it is immersed therein. When the relay form of the device is used, the control contacts are preferably under oil to minimize sparking.

The device comprises a heat responsive element, preferably in the form of a Bourdon tube 2, bent into a semi-circle. The Bourdon tube is a hollow sealed flexible tube which has been preferably exhausted and into which a charge of a volatile liquid, such as ether, has been introduced. Variations in temperature, produce variations in pressure within the tube, which cause variations in the curvature of the tube.

Wound around or otherwise thermally associated with the Bourdon tube 2, and electrically insulated therefrom, is a heating element 3 which is arranged in series in the circuit, so that the current which traverses the apparatus also traverses the heating element. One end of the Bourdon tube is held against movement, and the other end is free, so that variations in temperature of the heating element produce a movement of the free end of the tube. Connecting the free end and the fixed end of the tube is a depending toggle formed of the links 4—5 connected together at their contiguous ends by the pin 6. Connected to the pin 6, is the core 7 of the solenoid 8, which is arranged in series with the heating element 3 and which is supported on the curved tube midway of its ends. The magnetic effect of current in the solenoid tends to draw up the core 7 and straighten out the toggle, thereby producing a movement of the free end of the tube, the greater the current, the greater being the displacement of the free end of the tube. Similarly, an increase in current causes an increase in temperature of the heating element with a consequent increase in pressure within the tube, which tends to straighten out the tube, thus producing a displacement of the free end of the tube the increase in temperature of the heat responsive element is caused by the passage of current through the heating element 3 and the hysteresis losses in the spool or core upon which the solenoid 8 is wound, the heat produced by the hysteresis losses being conducted to the heat responsive element. Preferably, the heat produced in the spool by hysteresis is proportional to the heat produced in the electric apparatus being protected, by the hysteresis losses therein, so that the temperatures provided by hysteresis are substantially equal. The heating effect and the magnetic effect combine to move the free end of the tube and this movement is effective to cause the circuit to be opened.

In the construction shown in Figure 1, the heating element 3, which preferably consists of a coil wound around the tube, is connected to a contact 12 formed on the free end of the tube, and the contact 12 is connected by the wire 13 with the clips 14 of the switch 15. The switch is of the spring actuated type, so that when released it flies open, and is normally held closed by any suitable means, such as the latch 10. Connected to the latch is the core 16 of the solenoid 17 which is arranged to be energized to trip the latch when the free end of the tube has moved a predetermined distance. Arranged adjacent the contact 12 and spaced therefrom, is a contact post 18, carrying an adjustable contact, such as the screw 19, which may be adjusted to cause the control circuit to be closed for any desirable movement of the contact 12. The contact 19 is connected to the solenoid 17 by the wire 21 and the other side of the solenoid is connected to the supply lead 22 on the other side of the motor or other apparatus 23. When the solenoid circuit is closed, the latch is tripped and the switch opens, precluding the flow of current to the motor.

In the construction shown in Figure 2, the free end of the tube is provided with a projection or pin 24, which moves outward under the influence of an excess current to trip the latch 25 which holds the switch closed.

In the construction shown in Figure 3, the device of my invention is arranged to act also as a circuit breaker. One end of the tube is pivoted to the base 26 and a coiled spring 27 is arranged at the pivot which tends to throw the free end of the tube upward or outward. Arranged on the free end of the tube is a latch 28 which normally engages the pin or detent 29 secured to the base.

Secured to the free end of the tube is the contact 31 which is arranged to engage the contact 32 secured to the base. The contacts are arranged side by side so that the contact 31 may be moved slightly by the varying flexure of the tube without opening the circuit. When the latch has been moved a predetermined distance it disengages the detent, permitting the entire tube to spring upward, opening the circuit. The contact 32 is preferably mounted on a resilient support so that it is pressed into close engagement with the contact 31.

In Figure 4 I have shown a modified type of device which is constructed to open the switch on overloads and on no-voltage conditions. One side of the circuit is connected to the contact 48 on the end of the Bourdon tube 2 and this contact 48 is normally in contact with the adjustable contact 49 which is supported in the bracket 51. The control circuit includes a solenoid 52 in which is disposed a plunger 53, which, when the control circuit is opened or when the voltage thereof drops to a predetermined minimum, allows the plunger to drop and strike the switch retaining latch 54, thereby releasing the switch. The thermal effect of the current tends to separate the contacts 48 and 49 and thereby open the control circuit. I also prefer to include another break in the control circuit to insure the opening thereof on a large overload. Mounted on the core 7 of the solenoid 8 is a contact plate 55, which after the plunger has raised a predetermined distance, is moved from the contacts 56, 57 in the control circuit, thereby opening the circuit. The adjustable contact 49 is mounted in a sleeve 58 slidable in the bracket 51 and the sleeve is pressed forward by a spring 59, so that the contact 48 may move outward for a limited distance, before the control circuit is opened.

In Figure 5, I have shown the application of the device shown in Figure 1 to a three wire system connecting the generator 41 with the motor 42. Two protective devices 43—44 are employed, one in each of the outside wires and the switch 15 is held closed by the latch 10 which is actuated by the solenoid 45 which is connected to both relay devices and to the central wire 46. A dangerous current in any phase will cause the relay in that phase to operate the solenoid to release the switch.

The cooling or heat radiating characteristics of the device of my invention are the same as or directly proportionate to, the cooling or heat radiating characteristics of the motor or other apparatus, so that, after the device has operated to open the circuit, it cools at the same rate as the motor. Consequently, if the switch is closed, before the motor has cooled sufficiently, the device will immediately operate to again open the circuit and in the construction shown in Figure 3, the circuit breaker cannot be latched in the closed position, until the device has cooled.

I claim:

1. A protective device for an electric circuit comprising a switch having a stationary and a movable element, a thermal responsive device having a part free to move, an electromagnetically responsive device having a portion free to move, said part and said portion being attached to said movable element.

2. A protective device for an electric circuit comprising means for opening the circuit, and means operative by the combined cumulative thermal hysteretic and magnetic effects of the current in the circuit for operating said circuit opening means.

3. A protective device for an electric circuit comprising a thermal responsive device having a free end which is moved by variations in temperature, a heating element in thermal communication with the thermal responsive device, and a solenoid in series with the heating element serving to cause additional movement of said free end, movement of said end for a predetermined distance serving to open the circuit.

4. A protective device for an electric circuit comprising a thermal responsive device having a free end which is moved by variation in temperature, a heating coil surrounding said device and arranged in the circuit, a solenoid secured to said device intermediate its ends and arranged in circuit with the heating element, and a core in said solenoid connected to the free end of said thermal responsive device, movement of said end for a predetermined distance serving to open said circuit.

5. A protective device for an electric circuit comprising a curved Bourdon tube having a free end, a heating coil surrounding the tube and arranged in said circuit, a solenoid secured to the tube and a core in said solenoid connected to said free end whereby the thermal and magnetic effects of the current in the circuit combine to move said free end, movement of said end through a predetermined distance serving to open said circuit.

6. A protective device for an electric circuit comprising a curved Bourdon tube having a free end, a heating coil surrounding the tube and arranged in the circuit, a solenoid attached to the tube intermediate its ends and arranged in said circuit, a core in said solenoid, and a link connecting the core with the free end of the tube, movement of said end through a predetermined distance, serving to open said circuit.

7. A protective device for an electric circuit comprising a curved Bourdon tube having a free end, a heating coil surrounding the tube and arranged in the circuit, a solenoid attached to the tube intermediate its ends and arranged in said circuit, a core in said solenoid, a link connecting the core with the free end of the tube and means actuated by a movement of said free end through a predetermined distance to open said circuit.

8. A protective device for an electric circuit comprising a curved Bourdon tube having a free end, means operative by the thermal effect of the current in said circuit for causing a movement of said free end, and means operative by the magnetic effect of the current in said circuit for causing a movement of said free end.

9. A protective device for an electric circuit comprising a curved Bourdon tube having a free end, a heating element surrounding said tube and arranged in said circuit, a solenoid secured to said tube intermediate its ends and arranged in circuit with said heating element, a core in said solenoid and a toggle connecting the ends of the tube and connecting at its center to said core.

10. A protective device for an electric circuit containing electric apparatus, comprising an element in circuit with said apparatus, a magneto thermal responsve device, magneto thermally associated with said element, said element and device having hysteretic and heating characteristics corresponding directly to the hysteretic and heating characteristics of the apparatus, and means operated by an increase in magnetic flux and temperature of said magneto thermal responsive device, to open the circuit.

11. A protective device for an electric circuit comprising a thermal responsive device, a heating element associated with said thermal responsive device, a solenoid in thermal communication with said thermal responsive device, and in series with said heating element whereby the heat produced by hysteresis losses in said solenoid is conducted to said thermal responsive device, a core in said solenoid, and means connecting said core with said thermal responsive device, said solenoid and thermal responsive device operating conjointly to open the circuit.

12. A protective device for an electric circuit comprising means for controlling the circuit, and means responsive to the electromagnetic effect and means responsive to the heating effect, said means having thereon an element responsive to the hysteretic effect of the current traversing the circuit to operate the controlling means.

13. In a protective device for electric circuits the combination with a controlling device of means for effecting the operation of the controlling device and means responsive to the hysteretic characteristics of the device to be controlled connected to said first means so as to communicate the hysteretic heat losses to the first means.

14. In an electric circuit, the combination with an electrical apparatus connected thereto, of means for disconnecting the apparatus from the circuit, and means connected to the circuit having hysteretic characteristics corresponding to the hysteretic characteristics of the apparatus for effectuating said first mentioned means when the hysteretic heating effect in the apparatus reaches a predetermined value.

15. A protective device for an electric circuit containing electric apparatus, comprising means for disconnecting the apparatus from the circuit, and means associated with the circuit having hysteretic and electrical heating characteristics corresponding to the electrical heating and hysteretic characteristics of the apparatus for effectuating said first mentioned means.

16. A protective device for an electric circuit containing electric apparatus comprising means controlling the connection of the apparatus to the circuit and means having hysteretic characteristics corresponding to the hysteretic characteristics of the apparatus for controlling said first mentioned means.

17. A protective device for an electric circuit comprising means for controlling the circuit and means cumulatively subjected to the combined electromagnetic, heating and hysteretic effects of the current traversing the circuit to operate the controlling means.

18. A protective device for an electric circuit comprising a switch, means for operating said switch responsive to the cumulative heating and electro-magnetic effects of the current traversing said circuit.

19. A protective device for an electric circuit comprising a switch, means responsive to the heating effect of the current traversing the circuit, and means responsive to the electro-magnetic effect of the current traversing the circuit, both of said means acting cumulatively to operate the switch.

In testimony whereof, I have hereunto set my hand at San Francisco, California, this 5th day of November 1919.

SYDNEY NORTON BARUCH.

In presence of—
W. W. HEALEY,
M. E. EWING.